United States Patent [19]

Kimura et al.

[11] Patent Number: 4,698,569

[45] Date of Patent: Oct. 6, 1987

[54] APPARATUS FOR LOCATING A CARRIER AT A DESIRED POSITION

[76] Inventors: Yoshikazu Kimura, 555 Oiwake-cho, Kusatsu-shi, Shiga; Ikuo Sho, 480-1 Takamiya-cho; Yukio Hatabe, 6-47 Sakaemachi 2-chome, Hikone-shi, Shiga, all of Japan

[21] Appl. No.: 872,382

[22] Filed: Jun. 5, 1986

[30] Foreign Application Priority Data

Jun. 13, 1985 [JP] Japan .................................. 60-128928
Dec. 3, 1985 [JP] Japan .................................. 60-272195

[51] Int. Cl.$^4$ ............................................. G05B 19/20
[52] U.S. Cl. ........................................ 318/567; 355/74
[58] Field of Search .......................... 318/567; 355/74

[56] References Cited

U.S. PATENT DOCUMENTS 4,417,810 11/1983 Ueda et al. .......................... 355/74

Primary Examiner—William M. Shoop, Jr.
Assistant Examiner—Paul M. Bergmann

[57] ABSTRACT

An apparatus for locating a carrier, such as a lens carrier in a process camera unit, exactly at a desired position, the apparatus collecting data of the inertia acting upon the driving system including a motor and a shifting means, and obtaining a mean value from the collected measured values so as to correct the data of inertia in the driving system with the mean value. From the corrected data of inertia an information about the control of the driving system is derived, and applied to locate the carrier at a desired position.

11 Claims, 12 Drawing Figures

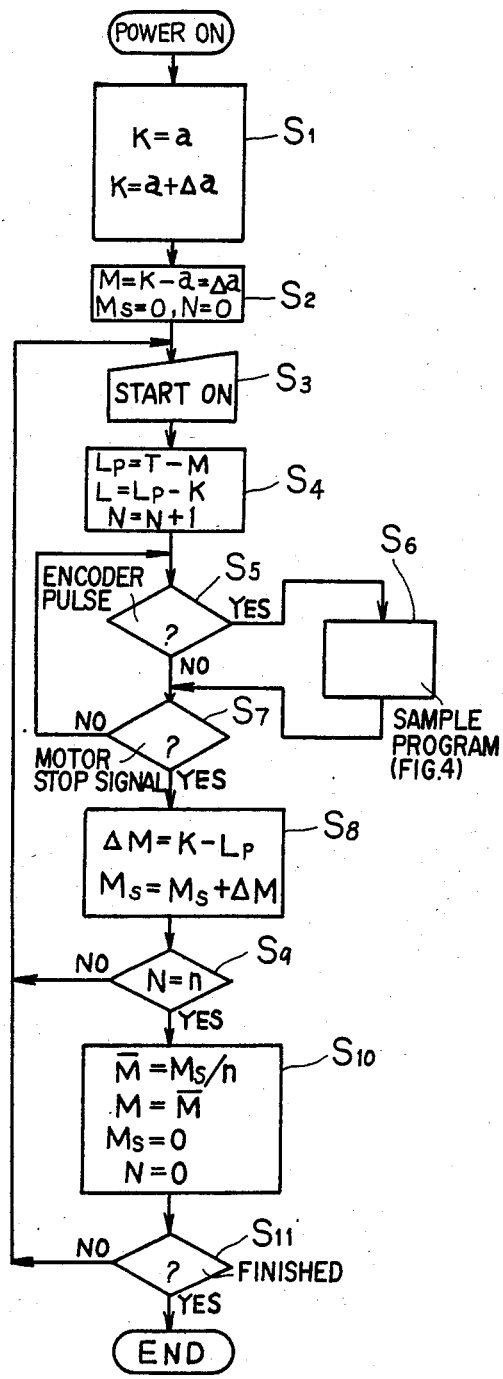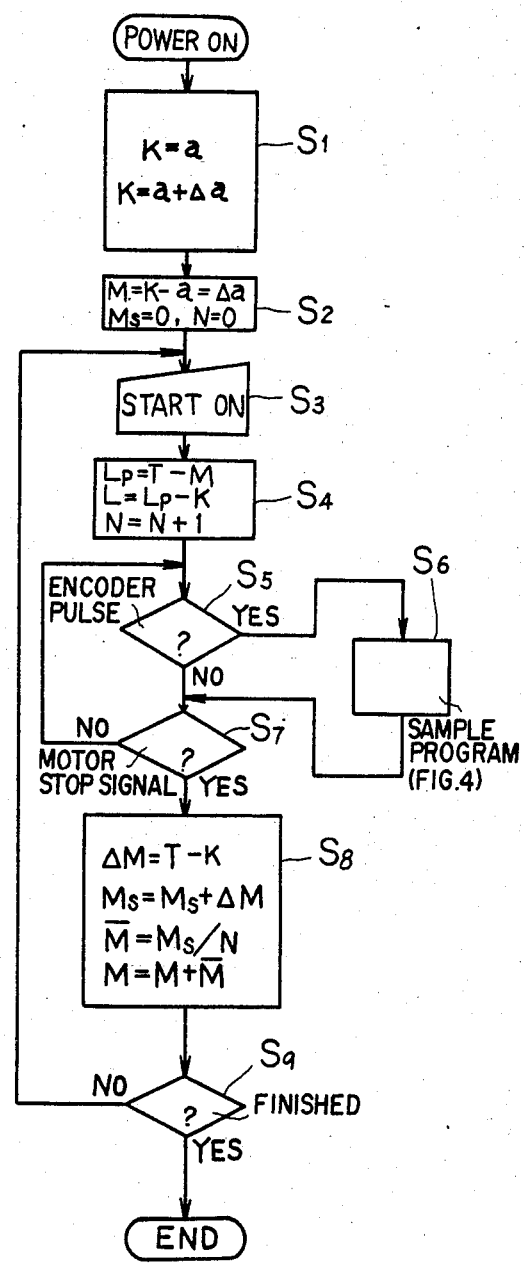

APPARATUS FOR LOCATING A CARRIER AT A DESIRED POSITION

BACKGROUND OF THE INVENTION

1. Field of the Invention

The present invention relates to an apparatus for locating a moving carrier, such as an originals carrier or a lens carrier used in a process camera unit, exactly at a desired position, wherein the apparatus includes a combination of a driving motor and an incremental encoder, such as a rotary encoder.

2. Description of the Prior Art

To locate a moving carrier precisely at a desired position, a stepping motor is commonly used. However the highly complicated circuit in the driving system of the stepping motor is a problem, as is the high cost thereof. To solve these problems an encoder, such as a rotary encoder, is usually employed. However when an encoder is used, it is unavoidable that the carrier moves a little further by inertia after the motor is deenergized, wherein the inertia occurs in the driving system including the motor.

In order to locate the carrier precisely at a desired position, the following methods can be generally adopted:

(1) The motor is electrically or mechanically stopped as soon as the number of pulses generated by the encoder reaches a predetermined value;

(2) When an induction motor is used as a motor, the speed of the motor is varied step by step. When a servomotor is used, the speed is continuously varied, and is reduced to a lowest possible value immediately before the number of pulses from the encoder reaches a predetermined value. When the number of pulses reaches the predetermined value, the driving signal to the motor is stopped; or (3) Every time the carrier passes a predetermined reference point, the counting of pulses is reset to a predetermined value, and accumulating errors are automatically corrected. This system is disclosed in Japanese Patent Publication (examined) No. 57 (1982)-13859, and is used in combination with either the above-mentioned (1) or (2).

The method mentioned in (1) requires an electrical or mechanical controller, and under this method it is unavoidable that the carrier is liable to shocks when it is braked. The method mentioned in (2) also requires a speed controller, which is likely to be complicated and expensive. This is a disadvantage.

A disadvantage common to the three prior methods is the difficulty of equalizing the dimensions, shapes and sizes of the components. The unequal components lead to the different movement of the carrier under inertia, which means that the movement of the carrier by inertia differs from apparatus to apparatus. In addition, variations in movement caused by inertia occurs in each apparatus over a long period of use. As a result the apparatus can not maintain its efficiency for a long time.

OBJECTS AND SUMMARY OF THE INVENTION

The present invention aims at solving the problems pointed out above, and has for its object to provide an apparatus for locating the carrier exactly at a desired, or target, position, wherein no complicated or expensive related devices, such as a braking device and a speed controller, are required.

Another object of the present invention is to provide an apparatus for locating the carrier exactly at a desired position, wherein variations in inertia occurring in the driving system are automatically corrected, thereby ensuring the operational reliability thereof over a long period of use.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description and drawings.

According to one aspect of the present invention there is provided an apparatus for locating the carrier at a desired position, the apparatus comprising:
- a shifting means for shifting a carrier in a desired direction;
- a driving means for driving the shifting means;
- position generating means operable in association with the shifting means;
- an input means for inputting a reference position signal, the means being located within the range of movement of the carrier;
- a target setting means;
- an arithmetic operation unit; and
- a motor driving circuit;
- wherein the arithmetic operation unit comprises a first memory for storing current position data of the carrier, the first memory being adapted to count pulses from the position signal generating means, a second memory for storing data corresponding to the rotations of the driving motor, a third memory for storing data of the inertia acting upon the carrier, and an arithmetic operator, whereby a driving quantity of the carrier is calculated on the basis of a target data from the target setting means, the current position data and the inertia data, the motor being driven based on the information of the driving quantity so as to move the carrier toward the target, and the current position data is corrected, or updated in accordance with the position taken by the carrier.

BRIEF DESCRIPTION OF THE DRAWINGS

FIG. 9 is a flow chart showing another example of a mode of control used in the apparatus of FIG. 6;

FIG. 10 is a flow chart showing a further example of a mode of control used in the apparatus of FIG. 6;

DETAILED DESCRIPTION OF THE INVENTION

Figure 1:
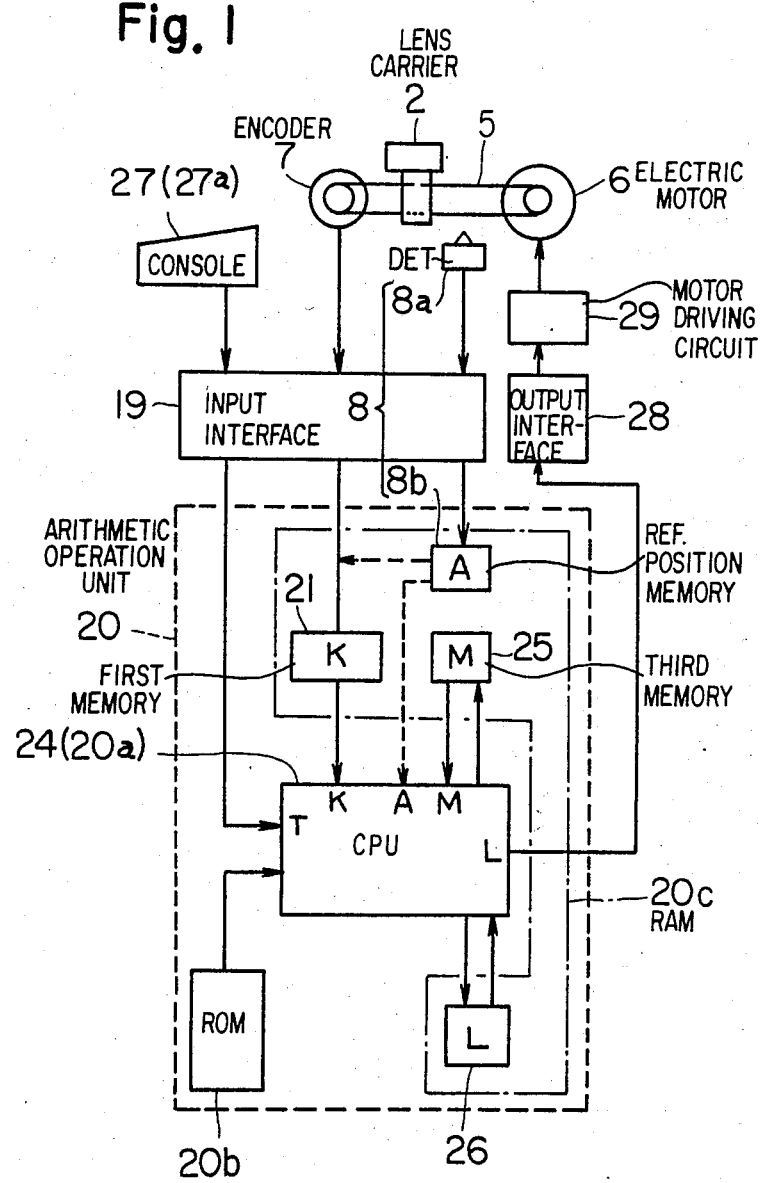
FIG. 1 is a block diagram showing an apparatus embodying the present invention.
Figure 2:
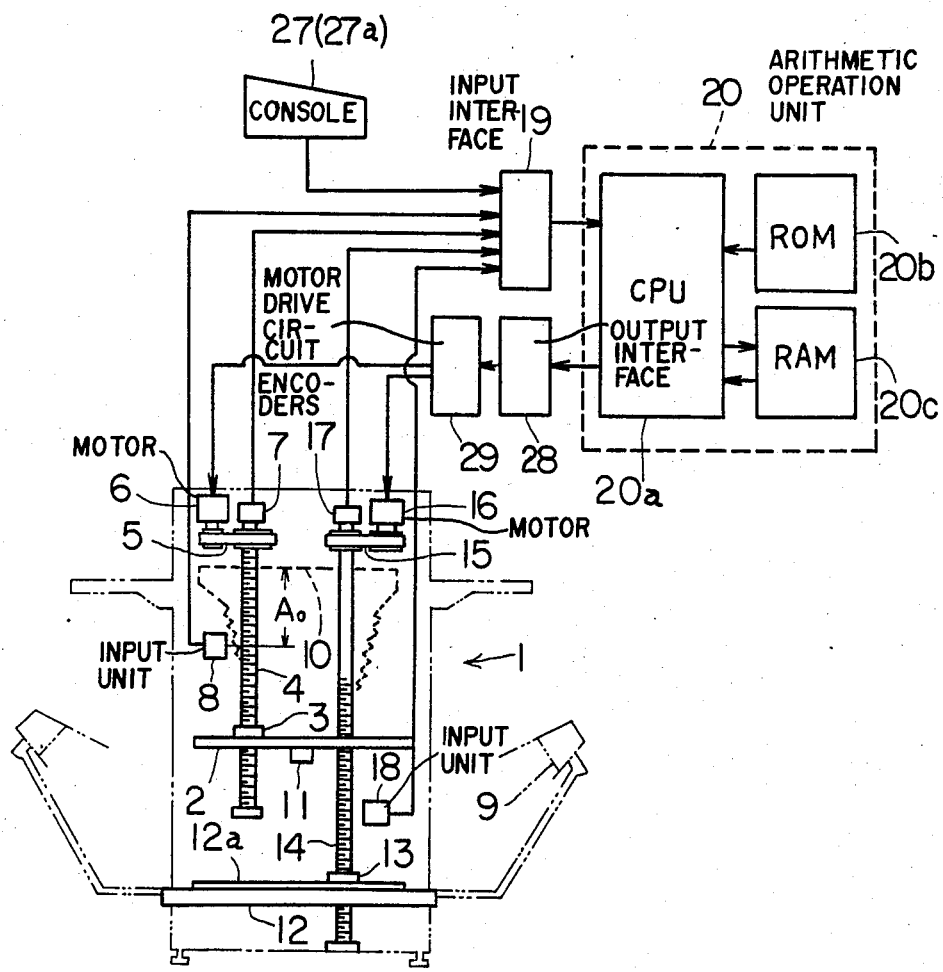
FIG. 2 is a schematic view showing a process camera incorporating the apparatus of the present invention.

Referring to FIGS. 1 and 2 the process camera is generally denoted by the reference numeral 1. A lens 11 is carried on a lens carrier 2, and an original 12a is carried on an originals carrier 12. These carriers 2 and 12 are driven by a drive-control unit, and are located at such a position as to secure a desired magnification. There is provided a source of light 9 whereby an image from the original 12a is formed through the lens 11 on a focus plane 10 on which a photosensitive material, such as a film, is placed.

The first drive-control unit includes feed-screw rods 4, 14, electric motors 6, 16 for rotating the feed-screw rods 4, 14, encoders 7, 17 connected to the feed-screw rods 4, 14, input units 8, 18 which are located at any point within the moving range of the carriers 2, 12, and provided with detectors, such as micro-switches, an arithmetic operation unit 20, and a motor driving circuit 29. By counting and controlling the pulses from the rotary encoders 7, 17 the carriers 2, 12 are located precisely at respective optical positions. The carriers 2, 12 are respectively provided with nuts 3, 13 engaging the threads of the rods 4, 14. The motors 6, 16 are connected to the feed-screw rods 4, 14 by means of belts 5, 15. The reference numeral 27 denotes a console which includes a magnification set-up means 27a, and the reference numerals 19, 28 denote an input interface, and an output interface, respectively.

Figure 3:
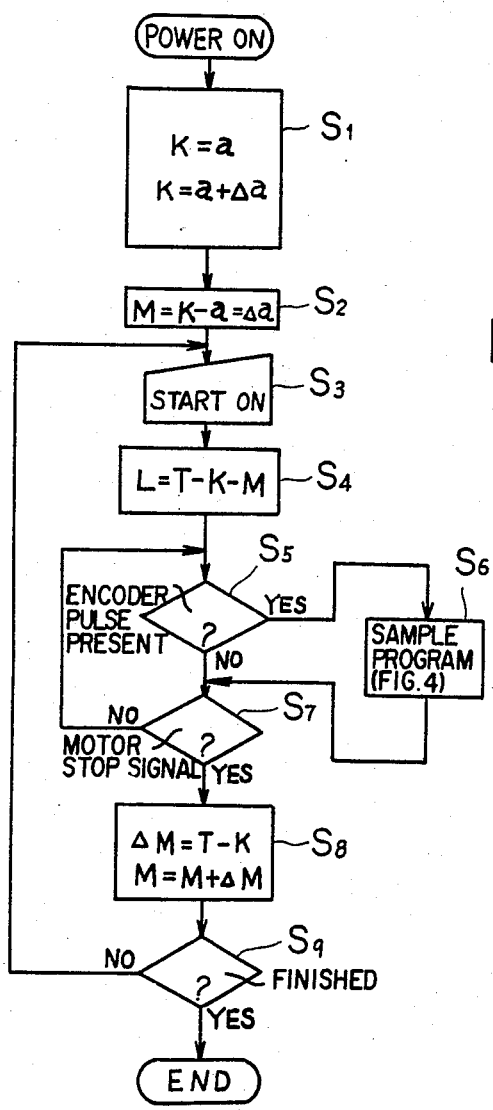
FIG. 3 is a flow chart showing a example of a mode of control used in the apparatus of FIG. 1.

The arithmetic operation unit 20 is a micro computer, which comprises a central processing unit 20a (hereinafter reffered to as CPU), a ROM 20b storing programs, and a RAM 20c storing data transmitted as signals. The CPU 20a is diagrammatically illustrated in FIG. 1. This unit 20 is constructed so that it may operate in accordance with the program flow chart shown in FIGS. 3 and 4, in which one of the features of the present invention lies.

The arithmetic operation unit 20 includes a first memory 21 which stores data (K) of the position of the carrier 2 by counting pulses from the rotary encoder 7, a second memory 26 which stores data (L) about the amount of drive corresponding to the rotations of the motor 6, a third memory 25 which stores data (M) of the quantity of inertia acting upon the motor 6, and an arithmetic unit 24 which performs logical operations on the basis of target data predetermined by the magnification set-up means 27a in the console 27, the data (K) and the data (M) so as to operate the data (L) of the quantity of drive for the motor 6.

Figure 5:
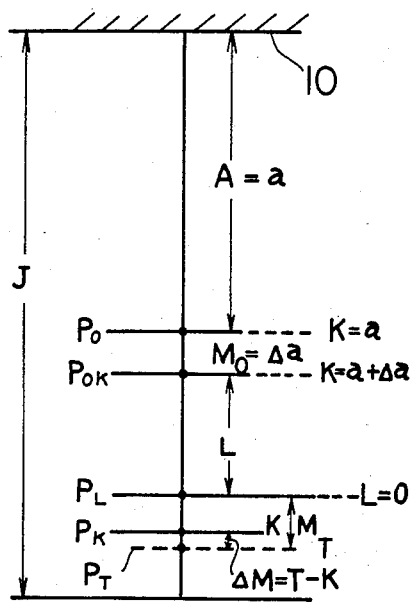
FIG. 5 is a chart showing a relationship between the position being taken by the carrier in FIG. 3 and the data thereof.

The carrier 2 is driven under a program previously input in the ROM 20b of the arithmetic operation unit 20. An example of the drive and control of the carrier 2 will be described in greater detail by reference to FIGS. 3, 4 and 5:

A switch in the console 27 is turned on. At a first step $S_1$ the motor 6 is started thereby to cause the carrier 2 to shift to a reference position Po. The arrival of the carrier 2 at the reference position is detected by means of a detector 8a of the reference position input unit 8, thereby turning off the drive signal to the motor 6. At the same time the reference position is written in as data (A), which is transmitted from a reference position memory 8b of the input unit 8 to a present position memory 21. As will be understood from the context of the specification, "present position" refers to the position which is current at any time. Thus, "present position data" refers to data identifying the current position of the carrier at a particular time. The data (A) is, for example, recorded in terms of the number (a) of pulses for a distance (A) from the focus plane 10 up to the reference position $P_o$, which is shown in FIG. 5. Even if the drive signal to the motor 6 is turned off, the carrier 2 goes over a small additional distance $M_o$ (corresponding to a number $\Delta a$ of pulses), and stops at a position Pok.

Therefore, the position data (K) of the position Pok is expressed by:

$$K = a + \Delta a$$

At a second step $S_2$ the arithmetic unit 24 performs the logical operation of $(K-a)$, and the incremental value $\Delta a$ is input as the inertia data (M) to the third memory 25. In this way the initial values after the motor 6 is started are input to the 1st and 3rd memories 21, 25.

At a third step $S_3$ the data (T) of the target position is given to the arithmetic unit 24 by inputting the desired magnification required for the magnification set-up means 27a. Then the start switch is turned on.

At a fourth step $S_4$ the data (L) of the quantity of the drive (which corresponds to the (L) in FIG. 5), wherein the drive quantity is obtained by subtracting the data (K) $(=a+\Delta a)$ of the inertia position and the data (M) $(=\Delta a)$ of inertia from the data (T) of the target position, and the carrier 2 is moved to a target direction in accordance with the data (L).

At the same time when the carrier 2 is started, it is determined at a fifth step $S_5$ whether or not there is a pulse signal from the encoder 7, and if a pulse signal 1 is present, the operation proceeds to the sixth step $S_6$, and if there is no pulse signal the operation proceeds to a seventh step $S_7$.

Figure 4:
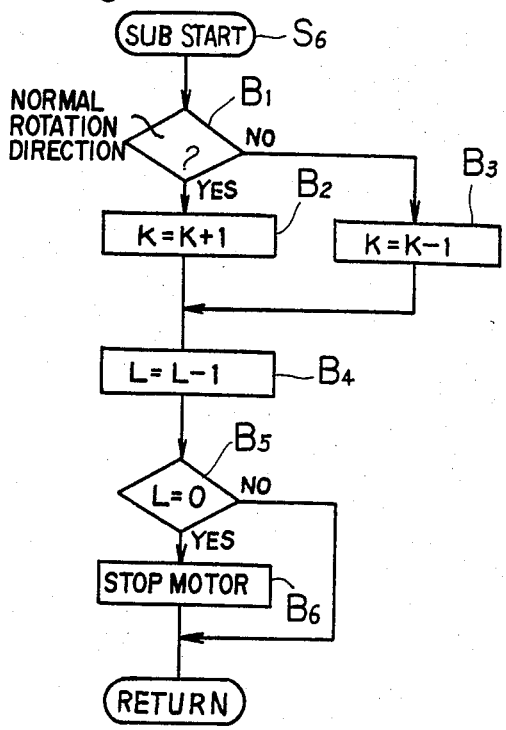
FIG. 4 is a flow chart showing a sub-program for the sixth step in FIG. 3.

The sixth step $S_6$ is a sample program which performs the arithmetic operation at each pulse from the encoder 7. The sample program $S_6$ is shown in FIG. 4, in which the rotating direction of the motor 6 is determined at a first sub-step $B_1$. When it is in the normal rotating direction 1 is added to the data (K) of the present carrier position at a second sub-step $B_2$, whereas, if it is in the reverse direction 1 is subtracted from the data (K) of the present carrier position.

At a fourth sub-step $B_4$ the data (L) of the amount of drive for the motor 6 is decreased one by one as the carrier 2 approaches the target position. At a fifth sub-step $B_5$ the result of the operation is determined. If the data (L) turns out to be zero, an instruction for stopping the motor 6 is output at a sixth sub-step $B_6$, and the presence of an output instructing the stop of the motor 6 is determined at a seventh step $S_7$. If the data (L) is not zero, the steps $B_1$ to $B_6$ are repeated.

In response to the motor-stop signal generated at the sub-step $B_6$ the motor-drive signal becomes "off" in advance of the target position (which corresponds to the position $P_L$ in FIG. 5), so that the carrier 2 stops at a point $P_T$ near the target position $P_k$ after having moved a little further toward the point $P_k$ by inertia. Herein a difference $\Delta M$ between the present position $P_k$ of the carrier and the target position $P_T$ is obtained as $\Delta M = T - K$.

This difference is added as a correction data $\Delta M$ to the inertia data (M), and a resulting fresh inertia data (M) is stored in an inertia increment memory 23.

At a ninth step $S_9$ it is judged whether the operation is finished or not; when it is not finished, the sequence is returned to the third step, and the above-mentioned steps are repeated.

In the illustrated embodiment the input unit 8 operates only when the initial value is input, but it is possible to input to the present position memory 21 every time the positions of the carrier 2 are detected by means of the detector 8a, wherein the data (K) of the present position of the carrier is converted into the predetermined value (a).

Figure 6:
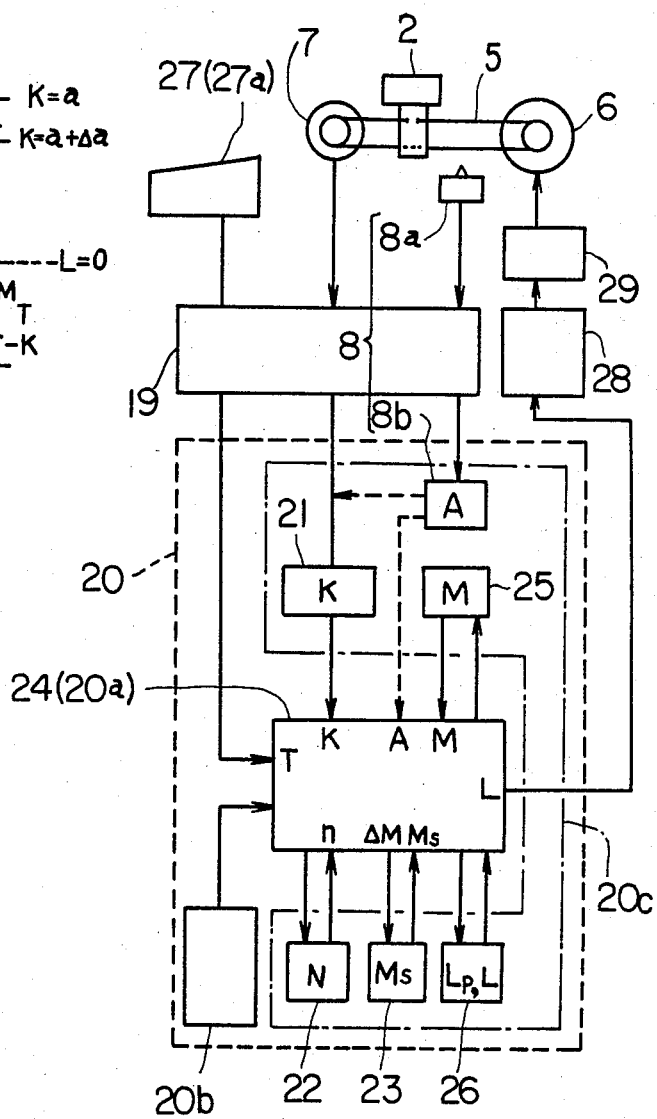
FIG. 6 is a block diagram showing another example of the embodiment according to the present invention.

Referring to FIG. 6, a modified version of the embodiment will be described:

An arithmetic operation unit 20 includes a present position memory 21 for storing data (K) of the present position of the carrier 2 by counting the pulse signals from a rotary encoder 7; an operation-number memory 22 for the frequencies of operations (N) occurring in the driving system including the motor 6, the driving means 4 and the carrier 2; an inertia increment memory 23 for summing increments $\Delta M$ of inertia acting upon the driving system, the inertia increment memory 23 for storing incremental values $M_S$ of an increment $\Delta M$ which is derived from each operation of the driving system; an arithmetic unit 24 for performing the arithmetic operation of mean inertia data $\overline{M}$ from the inertia incremental value $M_s$, and calculating a fresh inertial data M by putting the mean inertia data $\overline{M}$, and also for performing the arithmetic operation of a drive-quantity data (L) from the target position data (T), the present position data (K) and the new inertia data (M); an inertia quantity memory 25 for storing the inertia data (M); and a drive-quantity memory 26 for storing the drive-quantity data (L) which corresponds to the motor drive quantity.

Figure 7:
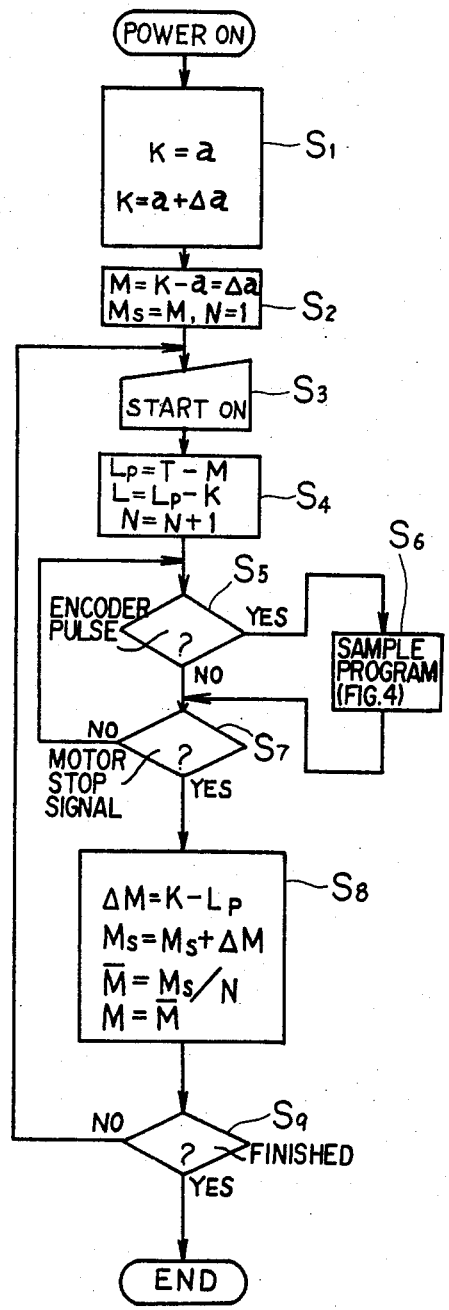
FIG. 7 is a flow chart showing an example of a mode of control used in the apparatus of FIG. 6.
Figure 8:
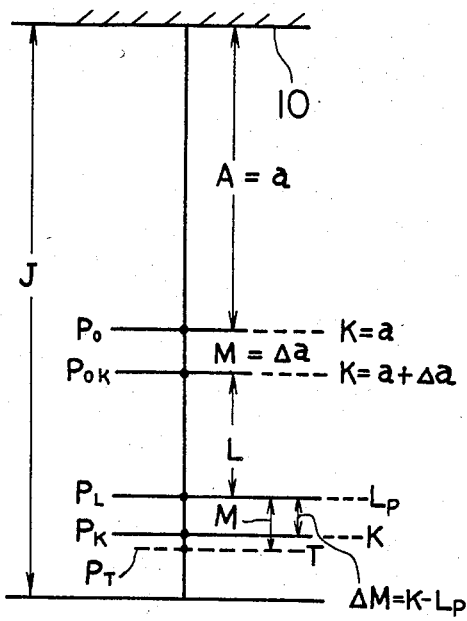
FIG. 8 is a chart showing a relationship between the position being taken by the carrier in FIG. 7 and the data thereof.
Figure 11:
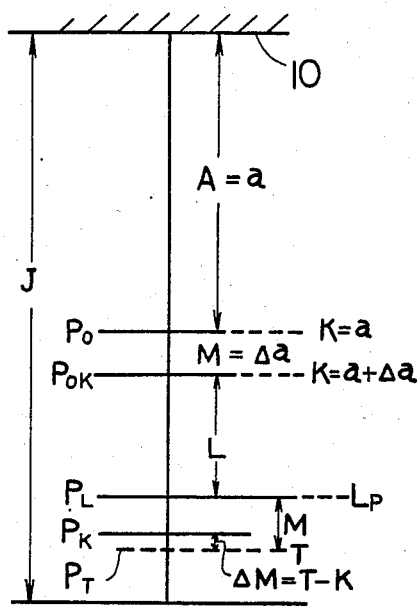
FIG. 11 is a chart showing a relationship between the position being taken by the carrier in FIG. 10 and the data thereof.

The carrier 2 is moved in accordance with the program previously input in the ROM 20b of the arithmetic operation unit 20b. FIG. 7 is a flow chart showing a first mode of control by this embodiment, and FIG. 8 is a chart showing a relationship between the positions taken by the carrier and the data thereof. Referring now to FIGS. 6 to 8 the mode of the drive control will be described:

The console 27 is energized. In the first step $S_1$ the motor 6 is started, thereby enabling the carrier 2 to shift to the reference position as predetermined. The arrival of the carrier 2 thereat is detected by means of the detector 8a, through which the driving signal to the motor becomes "off". When the arrival of the carrier is detected the data (A) (=a) of the reference position, which is already written in the memory, is input from the memory 8b to the present position memory 21.

Even if the driving signal becomes "off", the carrier does not immediately stop but moves by inertia over a distance $M_o$ (=$\Delta a$), and stops at a position $P_{ok}$. The data (K) of this present position at this position $P_{ok}$ is $K = a + \Delta a$.

Then, at the second step $S_2$ the operation of (K−A) is performed by the arithmetic unit 24, so as to input the measured pulse number $\Delta a$ to the inertia memory 25 as the data (M) of inertia. In this way the initial values are input to the present position memory 21 and the inertia amount memory 25.

In the second step $S_2$ M is stored in the inertia increment memory 23 as an incremental inertia quantity $M_s$, and 1 is stored in the operational frequency memory 22 as the frequency of operation (N), respectively.

In the third step $S_3$ a desired magnification is input to the magnification set-up means 27a in the console 27, thereby allocating the data (T) of the target position to the arithmetic unit 24. Then the start-switch is turned on.

In the fourth step $S_4$ the drive-off position data $L_p$ obtained by subtracting the inertia data (M) from the target position data (T), and the drive-quantity data (L) obtained by subtracting the present position data (K) from the drive-off data position data $L_p$ are respectively processed, and each result is stored in the drive amount memory 26. At each passage through the fourth step $S_4$ 1 is added to the frequency of operations in the driving system, which are input to the operational frequency memory 22.

The motor 6 is rotated in accordance with the drive-quantity data (L), thereby enabling the carrier 2 to move in a desired direction.

When the carrier 2 is moved, in the fifth step $S_5$ the presence of any pulse signal from the encoder 7 is ascertained. When it is present, the operation advances to the sixth step $S_6$, and when there is no pulse present, it advances to the seventh step $S_7$.

The sixth step $S_6$ is the same as that of FIG. 4, that is, a sub-program which performs an arithmetic operation at each pulse from the encoder 7. At the 1st sub-step $B_1$ a rotating direction of the motor 6 is determined; when it is in the clockwise direction, 1 is added to the present position data (K) at the 2nd sub-step $B_2$, whereas when it is in the counter-clockwise direction, 1 is subtracted from the data (K) at the 3rd sub-step $B_3$.

At the fourth sub-step $B_4$ the data (L) is reduced by 1 as the carrier 2 nears the target, and at the sub-step $B_5$ the result is determined. When the data (L) is zero, the motor stopping signal is output at the sixth sub-step $B_6$, and the presence of the motor stopping signal is determined at the seventh step $S_7$ in the main flow-chart, and unless the drive data (L) is zero, the above-mentioned steps $B_1$ to $B_6$ are repeated at the sub-routine.

At the eighth step $S_8$ the drive signal for the motor 6 becomes "off" immediately before the target, in response to the motor stop signal generated at the substep $B_6$. As a result the carrier 2 continues to move by inertia from the Point $P_L$ up to the Point $P_K$ near the target $P_T$, wherein the $P_L$ is a signal cut-off point.

In the first mode of control the quantity of movement of the carrier 2 by inertia is controlled as an inertia variable $\Delta M$, which is obtained by: $\Delta M = K - L_P$, wherein K and $L_P$ are data of the positions corresponding to the positions $P_K$ and $P_L$.

The inertia variable $\Delta M$ is determined each time the driving system is stopped, and its incremental value $M_S$ is stored at the memory 23. The incremental value $M_S$ is divided by the operational frequency N, thereby obtaining a mean inertia value $\overline{M}$. This value $\overline{M}$ is replaced by the previous inertia data (M) which was used to seek the driving data (L) for the driving system, and stored at a memory 25. The subsequent driving data (L) is obtained on the basis of this fresh data (M).

At the ninth step $S_9$ it is determined whether or not the operation should be continued, and so long as the operation is not finished, the sequence returns to the third step $S_3$, and the sequence from $S_3$ to $S_9$ is repeated.

Referring to FIG. 9 a second mode of control constructed for the second example of the present invention will be described:

Every time the operational frequency of the driving system reaches a desired predetermined value n (for example, 10 times), the mean value $\overline{M}$ of the inertia variable $\Delta M$ is calculated, and the previous data (M) is repeated by $\overline{M}$. At the ninth step of FIG. 9 it is determined whether the frequency (N) of the driving system has reached n or not. When the system has operated n times, a mean value $\overline{M}$ is calculated at the tenth step, and the previously calculated inertia data (M) is replaced by the freshly calculated data $\overline{M}$. At this stage the sum of the inertia increments $M_S$ ($\Delta M_1 + \Delta M_2 + \Delta M_3 + \ldots$) and the operational frequency (N) are cleared. In the next tenth time operation, the subsequent driving data L is obtained at the fourth step on the basis of this inertia data (M).

Referring to FIG. 10 a third mode of control constructed for the second example of the present invention will be described:

A plus or minus quantity of a stop position $P_K$ of the carrier 2 with respect to the target $P_T$ is regulated as an inertia variable $\Delta M$, which is obtained by: $\Delta M = T - K$, wherein T is a position data of the target $P_T$. Every time the driving system is operated and stopped the inertia data (M) has a plus quantity or a minus quantity $\Delta M$ added or subtracted, thereby effecting the correction or updating of data.

At the eighth step $S_8$ of FIG. 10 the inertia variable $\Delta M$ is calculated each time the driving system stops, and this value is added to obtain an inertia increment $M_s$, which is stored at the memory 23. The value $M_S$ is divided by the frequency N so as to obtain a mean inertia increment $\overline{M}$. The previous data (M) is corrected by algebraically adding this fresh data $(\overline{M})$. The corrected data $(\overline{M})$ is stored at the memory 25. The subsequent driving data (L) is calculated by this fresh data $(\overline{M})$.

Figure 12:
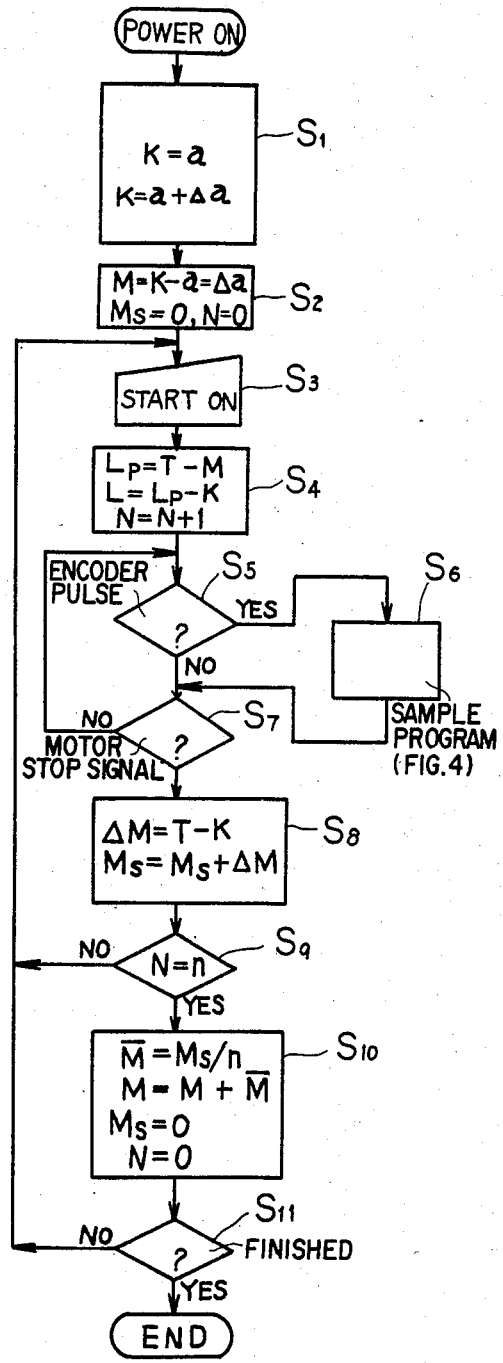
FIG. 12 is a flow chart showing a fourth example of a mode of control used in the apparatus of FIG. 6.

Referring to FIG. 12, a fourth mode of control for the second example will be described:

The third mode of control operates to correct the inertia data (M) at each time, whereas the fourth mode operates to correct the inertia data (M) for its plus or minus component each time the frequency N reaches a desired value n.

As evident from the foregoing description, under the present invention the inertia occurring in the driving system is observed and measured as digital data, and from the values collected a mean value is obtained at each operation or at a predetermined operational frequency. The data of inertia in the driving system is corrected with the mean value, and from the corrected data information is derived about the control of the driving system, and applied so as to deenergize the driving signal provided to the driving system when the carrier has moved to a point near the target. The main advantages of the present invention are as follows;

(1) Even if the inertias acting upon the driving system including the motor and the shifting means are unequal, it is not necessary to adjust them individually;

(2) Even if the inertias acting upon the driving system vary under climatic influence and/or over a long period of use, they are automatically corrected. As a result the high operational reliability and preciseness is maintained for a long time; and (3) No extra braking devices or speed controller are required, thereby resulting in structural simplicity and production economy.

What is claimed is:

1. An apparatus for locating a moving carrier at a desired position in a photographic reproducing machine, the apparatus comprising:
   a shifting means for shifting a carrier in a desired direction;
   a driving means for rotatably driving the shifting means;
   a position generating means operable in association with the shifting means;
   an input means for inputting a reference position signal, the input means being located within the range of movement of the carrier;
   a target setting means;
   an arithmetic operation unit; and
   a motor driving circuit;
   wherein the arithmetic operation unit comprises a first memory for storing current position data of the carrier, the first memory being adapted to count pulses from the position signal generating means, a second memory for storing data corresponding to the rotations of the driving means, a third memory for storing data of inertia acting upon the carrier, and an arithmetic operator, whereby a driving quantity of the carrier is calculated on the basis of target data from the target setting means, the current position data of the carrier and the inertia data, the driving means being driven based on the data of the driving quantity so as to move the carrier toward the target, and the current position data is updated in accordance with the position taken by the carrier.

2. An apparatus as defined in claim 1, wherein the reference position input means inputs the current position data in the first memory in terms of digits only when the input means detects the position of the carrier for the first time after the system is energized.

3. An apparatus as defined in claim 1, wherein the reference position input means inputs the current position data in the first memory in terms of digits every time the input means detects the carrier.

4. An apparatus as defined in claim 1, wherein the shifting means comprises a feed screw rotatively supported in the carrier.

5. An apparatus as defined in claim 1, wherein the carrier comprises a frame carrying a process camera.

6. An apparatus for locating a moving carrier at a desired position, the apparatus comprising:
   a shifting means for shifting a carrier in a desired direction;
   a driving means for rotatably driving the shifting means;
   a position generating means operable in association with the shifting means;
   an input means for inputting a reference position signal, the input means being located within the range of movement of the carrier;
   a target setting means;
   an arithmetic operation unit; and
   a motor driving circuit;
   wherein the arithmetic operation unit comprises a first memory for storing current position data of the carrier, the first memory being adapted to count pulses from the position signal generating means, a second memory for storing operational frequencies of the driving means, a third memory for storing inertia increments, an arithmetic operation, a fourth memory for storing data of the inertia acting upon the driving means, and a fifth memory for storing data corresponding to rotation of a driving motor of said driving means, whereby the arithmetic operator performs an operation on target data from the target setting means, current position data from the first memory and inertia data from the fourth memory, thereby obtaining information about the driving quantity, on the basis of which the motor driving circuit is controlled, the inertia increment being calculated from the data of the position of the carrier at which the moving carrier stops toward the target, the inertia increment being divided by the operational frequency so as to obtain a mean inertia quantity, which calculated to obtain a fresh inertia data, which is stored in the fourth memory.

7. An apparatus as defined in claim 6, wherein the fifth memory stores data of a position at which a motor driving signal is cut off.

8. An apparatus as defined in claim 7, wherein an inertia variable representing the inertia increments is obtained as a difference between the data of the present position at which the carrier stops, and the cut-off position data obtained before the carrier stops, and wherein a mean inertia quantity is calculated every time the carrier stops, thereby substituting the mean inertia quantity for the inertia data.

9. An apparatus as defined in claim 7, wherein an inertia variable representing the inertia increments is obtained as a difference between the data of the present position at which the carrier stops, and the cut-off position data obtained before the carrier stops, and wherein a mean inertia quantity is calculated every time the operational frequency of the driving system reaches a desired value, thereby substituting the mean inertia quantity for the inertia data.

10. An apparatus as defined in claim 6, wherein an inertia variable representing the inertia increments is obtained as a difference between the target data and the data of the position at which the carrier has stopped, thereby obtaining a mean inertia quantity at each stoppage of the carrier, and wherein the previous inertia data is corrected through algebraic addition of the mean inertia quantity.

11. An apparatus as defined in claim 6, wherein an inertia variable representing the inertia increments is obtained as a difference between the target data and the data of the position at which the carrier has stopped, thereby obtaining a mean inertia quantity every time the operation frequency of the carrier reaches a desired value, and wherein the fresh inertia data is obtained by correcting the previous inertia data through algebraic addition of the mean inertia quantity.

* * * * *

UNITED STATES PATENT AND TRADEMARK OFFICE
CERTIFICATE OF CORRECTION

PATENT NO. : 4,698,569

DATED : October 6, 1987

INVENTOR(S) : Yoshikazu Kimura, Ikuo Sho and Yukio Hatabe

It is certified that error appears in the above-identified patent and that said Letters Patent is hereby corrected as shown below:

Cover page, item [73] should be inserted as follows:

--[73] Assignee: Dainippon Screen Mfg. Co., Ltd., Kyoto, Japan--

Signed and Sealed this

Twenty-sixth Day of April, 1988

Attest:

DONALD J. QUIGG

*Attesting Officer*    *Commissioner of Patents and Trademarks*